(12) United States Patent
Porras et al.

(10) Patent No.: US 11,314,614 B2
(45) Date of Patent: Apr. 26, 2022

(54) SECURITY FOR CONTAINER NETWORKS

(71) Applicant: SRI International, Menlo Park, CA (US)

(72) Inventors: Phillip A. Porras, Cupertino, CA (US); Vinod Yegneswaran, Foster City, CA (US); Jaehyun Nam, Daejeon (KR); Seungwon Shin, Daejeon (KR)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 17/125,551

(22) Filed: Dec. 17, 2020

(65) Prior Publication Data

US 2021/0211408 A1 Jul. 8, 2021

Related U.S. Application Data

(60) Provisional application No. 62/956,408, filed on Jan. 2, 2020.

(51) Int. Cl.
*H04L 29/06* (2006.01)
*G06F 11/34* (2006.01)
(Continued)

(52) U.S. Cl.
CPC .......... *G06F 11/3409* (2013.01); *G06F 11/36* (2013.01); *G06N 3/08* (2013.01);
(Continued)

(58) Field of Classification Search
CPC ..... G06F 11/3409; G06F 11/36; G06N 10/00; G06N 3/08; H04L 63/0236; H04L 63/1425; H04L 63/20; H04L 61/103; H04L 63/029

See application file for complete search history.

(56) References Cited

U.S. PATENT DOCUMENTS 8,635,686 B2 * 1/2014 Sriram ................. H04L 63/102
726/12
9,754,122 B1 * 9/2017 Christopher ........ G06F 21/6218
(Continued)

FOREIGN PATENT DOCUMENTS

| KR | 20150038500 A | * | 4/2015 | ............. G06F 21/62 |
| KR | 20150128876 A | * | 11/2015 | ............. H04L 61/10 |
| KR | 20190015273 A | * | 2/2019 | ............. H04L 63/10 |

OTHER PUBLICATIONS

Wei Zhang, Guyue Liu, Wenhui Zhang, Neel Shah, Phillip Lopreiato, Gregoire Todeschi, KK Ramakrishnan, and Timothy Wood. 2016. OpenNetVM: A platform for high performance network service chains. In Proceedings of the workshop on Hot topics in Middleboxes and Network Function Virtualization. ACM.
(Continued)

*Primary Examiner* — Shin-Hon (Eric) Chen
(74) *Attorney, Agent, or Firm* — Moser Taboada

(57) ABSTRACT

A method, apparatus and system for providing security for a container network having a plurality of containers includes establishing a network stack for each of the plurality of containers of the container network, determining network and policy information from active containers, based on a set of pre-determined inter-container dependencies for the plurality of containers learned from the determined network and policy information, configuring container access in the container network to be limited to only containers of the plurality of containers that are relevant to a respective communication, and configuring inter-container traffic in the container network to be directed only from a source container into a destination container in a point-to-point manner such that exposure of the inter-container traffic to peer containers is prevented.

20 Claims, 14 Drawing Sheets

(51) Int. Cl.
- *G06N 10/00* (2022.01)
- *G06N 3/08* (2006.01)
- *G06F 11/36* (2006.01)
- *H04L 61/103* (2022.01)

(52) U.S. Cl.
CPC ......... *G06N 10/00* (2019.01); *H04L 63/0236* (2013.01); *H04L 63/1425* (2013.01); *H04L 63/20* (2013.01); *H04L 61/103* (2013.01); *H04L 63/029* (2013.01)

(56) References Cited

U.S. PATENT DOCUMENTS

| | | | | |
|---|---|---|---|---|
| 9,787,567 | B1* | 10/2017 | Mehta | H04L 43/12 |
| 10,673,881 | B2* | 6/2020 | Alderson | H04L 63/10 |
| 11,089,064 | B1* | 8/2021 | Sarukkai | H04L 63/0281 |
| 2006/0129670 | A1* | 6/2006 | Mayer | H04L 41/00 709/223 |
| 2008/0123536 | A1* | 5/2008 | Johnson | H04L 41/12 370/241 |
| 2008/0301765 | A1* | 12/2008 | Nicol | H04L 63/20 726/1 |
| 2016/0219019 | A1* | 7/2016 | Mathur | H04L 67/16 |
| 2017/0279770 | A1* | 9/2017 | Woolward | H04L 63/20 |
| 2017/0315795 | A1* | 11/2017 | Keller | G06F 11/3409 |
| 2017/0351862 | A1* | 12/2017 | Mohinder | G06F 21/57 |
| 2017/0353496 | A1* | 12/2017 | Pai | H04L 63/10 |
| 2018/0131723 | A1* | 5/2018 | Deluca | H04L 63/20 |
| 2018/0359218 | A1* | 12/2018 | Church | H04L 63/0272 |
| 2019/0020665 | A1* | 1/2019 | Surcouf | H04L 9/3236 |
| 2020/0241903 | A1* | 7/2020 | Wang | H04L 61/2007 |
| 2020/0389433 | A1* | 12/2020 | Zivic | H04L 63/0227 |
| 2021/0026700 | A1* | 1/2021 | Manickam | G06F 9/5055 |
| 2021/0133336 | A1* | 5/2021 | Andrews | G06F 21/53 |
| 2021/0136084 | A1* | 5/2021 | Dayan | H04L 63/105 |
| 2021/0320938 | A1* | 10/2021 | Ober | G06F 21/606 |

OTHER PUBLICATIONS

Rui Shu, Xiaohui Gu, and William Enck. 2017. A Study of Security Vulnerabilities on Docker Hub. In Proceedings of the Conference on Data and Application Security and Privacy. ACM.

Yuqiong Sun, David Safford, Mimi Zohar, Dimitrios Pendarakis, Zhongshu Gu, and Trent Jaeger. 2018. Security Namespace: Making Linux Security Frameworks Available to Containers. In Proceedings of the Security Symposium. USENIX.

Byungchul Tak, Hyekyung Kim, Sahil Suneja, Canturk Isci, and Prabhakar Kudva. 2018. Security Analysis of Container Images Using Cloud Analytics Framework. In International Conference on Web Services. Springer.

Netfilter and IPtables. 2014. Retrieved Apr. 17, 2019 from https://www.netfilter.org.

Zhiming Shen, Zhen Sun, Gur-Eyal Sela, Eugene Bagdasaryan, Christina Delimitrou, Robbert Van Renesse, and Hakim Weatherspoon. 2019. X-containers: Breaking down barriers to improve performance and isolation of cloud-native containers. In Proceedings of the International Conference on Architectural Support for Programming Languages and Operating Systems. ACM.

Danyang Zhuo, Kaiyuan Zhang, Yibo Zhu, Hongqiang Harry Liu, Matthew Rockett, Arvind Krishnamurthy, and Thomas Anderson. 2019. Slim: OS Kernel Support for a Low-Overhead Container Overlay Network. In Proceedings in the Symposium on Networked Systems Design and Implementation. USENIX.

* cited by examiner

ALGORITHM 1 EXTRACTING INTER-CONTAINER DEPENDENCIES

1: Input: $C$, which is the set of all active containers
2: for each container $u \in C$ do
3:     for each container $v \in C$ where $u \neq v$ do
4:        if $v \in u.explicitDependents$ then
5:           $p_{uv} = u.EgressPolicies \cap v.IngressPolicies$
6:           add $v$ into $u.dependencyMap$ with $p_{uv}$
7:        else if $u.containerSet \neq v.containerSet$ then
8:           for each service pair $s \in S_{set}(v.containerSet)$ do
9:              $p_{us} = u.EgressPolicies \cap s.Port$
10:             add $s.IP$ into $u.dependencyMap$ with $p_{us}$
11:     for each service pair $s \in S_{microservice}$ do
12:        $p_{us} = u.EgressPolicies \cap s.Port$
13:        add $s.IP$ into $u.dependencyMap$ with $p_{us}$

FIG. 3

```
50:11.375228 IP   10.46.0.3.40133 > 10.46.0.4.8000:  Flags  [S],
50:11.375279 IP   10.46.0.4.8000 > 10.46.0.3.40133:  Flags  [S.],
```

| ← → | 143. | .53. | :31366/content.html |

Service

| ← → | 143. | .53. | :31366/content.html |

Attack!

```
28:03.448899 IP 10.46.0.3.22167 > 10.46.0.4.8000: Flags [S],
28:03.448899 IP 10.46.0.3.22167 > 10.46.0.4.8000: Flags [S],
28:03.449027 IP 10.46.0.4.8000 > 10.46.0.3.22167: Flags [S.]
28:03.449047 IP 10.46.0.4.8000 > 10.46.0.3.22167: Flags [S.]
28:03.449155 IP 10.46.0.3.22167 > 10.46.0.4.8000: Flags [R],
28:03.449193 IP 10.46.0.3.22167 > 10.46.0.4.8000: Flags [R],
```

FIG. 9A

```
29:52.941051 IP 10.46.0.3.12119 > 10.46.0.4.8000: Flags [S],
29:52.941117 IP 10.46.0.3.12119 > 10.46.0.4.8000: Flags [S],
29:52.941338 IP 10.46.0.3.12119 > 10.46.0.4.8000: Flags [R],
29:52.941384 IP 10.46.0.3.12119 > 10.46.0.4.8000: Flags [R],
```

FIG. 9B

```
20:21.353453 IP 10.46.0.4.8000 > 10.46.0.3.34104: Flags [R],
20:21.353456 IP 10.46.0.4.8000 > 10.46.0.3.34104: Flags [R],
```

FIG. 10A

```
20:21.353420 IP 10.46.0.3.34104 > 10.46.0.4.8000: Flags [.],
20:21.353460 IP 10.46.0.4.8000 > 10.46.0.3.8000: Flags [R],
```

FIG. 10B

```
11:11.995745 IP 10.46.0.4.8000 > 10.46.0.3.12346: Flags [R],
11:11.995762 IP 10.46.0.4.8000 > 10.46.0.3.12346: Flags [R],
```

FIG. 10C

11:11.995614 IP 10.46.0.3.33452 > 10.46.0.4.8000: Flags [P.],
11:11 995655 IP 10.46.0.4.8000 > 10.46.0.3.33452: Flags [.],
11:11 995848 IP 10.46.0.4.8000 > 10.46.0.3.33452: Flags [.],
11:11.995866 IP 10.46.0.3.33452 > 10.46.0.4.8000: Flags [.],

SECURITY FOR CONTAINER NETWORKS

CROSS-REFERENCE TO RELATED APPLICATIONS

This application claims benefit of and priority to U.S. provisional patent application Ser. No. 62/956,408, filed Jan. 2, 2020, which is herein incorporated by reference in its entirety.

GOVERNMENT STATEMENT

This invention was made with Government support under grant number 1514503 awarded by the National Science Foundation. The Government has certain rights in this invention.

FIELD

Embodiments of the present principles generally relate to container network applications and, and more particularly, to providing security for container networks.

BACKGROUND

Containers are utilized widely to decompose complex production Internet services into manageable (componentized) microservices. The use of containerization technologies for virtual application deployment, particularly for the scalable instantiation of production microservices, has grown at an astonishing rate. However, while inter-container networking is indispensable for microservices, the question of the robustness of container networking has not been well scrutinized from a security perspective. One critical issue that arises is the extent to which containerized environments can enforce security isolation when the containerized environments host network-exposed microservices that are attacked and subverted.

Substantially, any application can be nearly hijacked and then subverted to attack other containers or the host operating system (OS). Containers offer less application isolation than virtual machines (VMs). One security approach has been to use IP-tables based firewalling, however, this is a manual, error-prone approach and has high-overhead.

SUMMARY

Embodiments of methods, apparatuses and systems for providing security for container networks are disclosed herein.

In some embodiments in accordance with the present principles, a method for providing security for a container network having a plurality of containers includes establishing a network stack for each of the plurality of containers of the container network, determining network and policy information from active containers, based on a set of predetermined inter-container dependencies for the plurality of containers learned from the determined network and policy information, configuring container access in the container network to be limited to only containers of the plurality of containers that are relevant to a respective communication, and configuring inter-container traffic in the container network to be directed only from a source container into a destination container in a point-to-point manner such that exposure of the inter-container traffic to peer containers is prevented.

In some embodiments, the method can include determining the inter-container dependencies for each of the plurality of containers. In some embodiments, learning the inter-container dependencies can include using Address Resolution Protocol (ARP) requests that identify network information associated with each respective container. In such embodiments, the method can include verifying that a source container has a dependency on a destination container in the container network before fulfilling a respective ARP request.

In some embodiments in accordance with the present principles, a system for providing security for container networks includes a global manager configured to establish a network stack for each of the plurality of containers of the container network and to determine network and policy information from active containers, at least one network visibility service configured to, based on a set of predetermined inter-container dependencies for the plurality of containers learned from the determined network and policy information, limit container access in the container network to only containers of the plurality of containers that are relevant to a respective communication, and at least one traffic visibility service configured to direct inter-container traffic in the container network from a source container into a destination container in a point-to-point manner such that exposure of the inter-container traffic to peer containers is prevented.

In some embodiments in accordance with the present principles, a method for providing security for container networks having a plurality of containers includes monitoring traffic in the container networks and generating network logs of the container traffic, determining network and policy information of the container networks from the network logs, determining a least privileged communication policy for the plurality of containers from the determined network and policy information, configuring container access in the container networks to be limited to only containers of the plurality of containers that are relevant to a respective communication based on the determined least privileged communication policy, and configuring inter-container traffic in the container networks to be directed only from a source container into at least one destination container in a point-to-point manner such that exposure of the inter-container traffic to peer containers is prevented.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIG. 3 depicts an algorithm for extracting inter-container dependencies in accordance with an embodiment of the present principles.

FIG. 9A depicts packet data showing an example of the traffic that an attacker can see of the spoofed target container of FIG. 6 without the end-to-end forwarding of the present principles.

FIG. 9B depicts packet data exemplifying how an attacker cannot see response traffic with the end-to-end forwarding of the present principles.

FIG. 10A depicts packet data showing the injection of RST packets by an attacker into a container of a container network having a prior security architecture.

FIG. 10B depicts packet data showing how the injection of RST packets into a container by the attacker causes session termination from the point of view of the Nginx-User.

FIG. 10C depicts packet data related to an attempt of an attacker to inject RST packets into a container security system implementing source verification in accordance with an embodiment the present principles.

Figure 1:
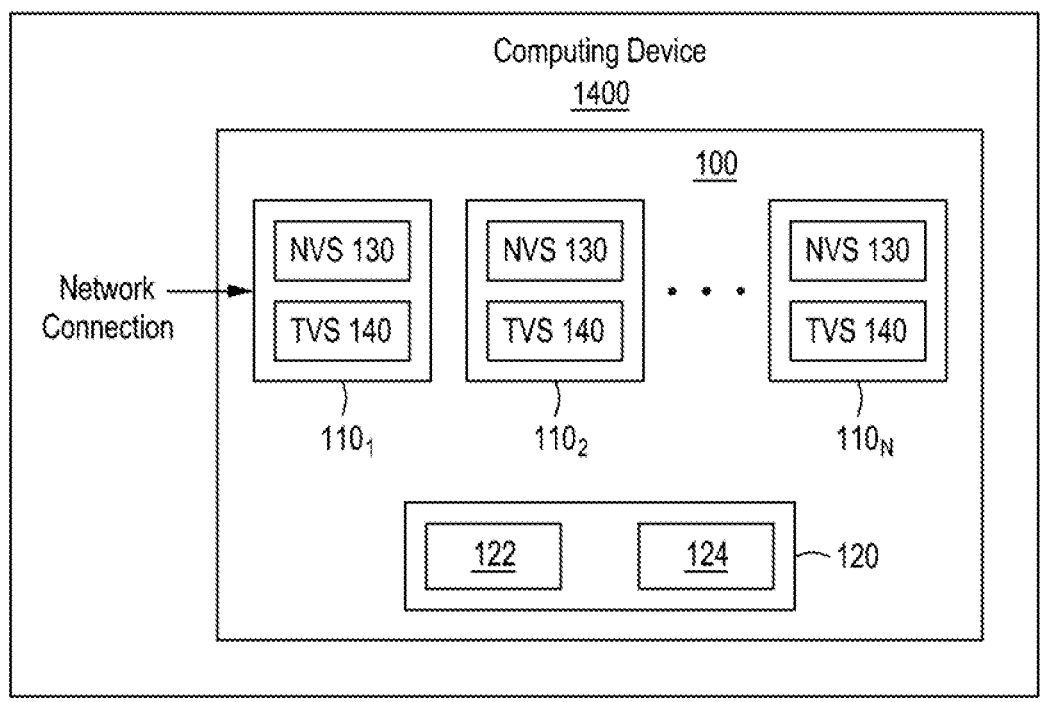
FIG. 1 depicts a high-level block diagram of a container security system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for providing security for container networks. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific container applications and container networks, such teachings should not be considered limiting. Embodiments in accordance with the present principles can function with substantially any container applications and container networks.

Embodiments of the present principles provide a new container network stack. In some embodiments, an architecture of the present principles instantiates a container network stack per container offering isolation, performance efficiency and a fine-grained network security policy specification that implements a least-privilege network access for each container. Embodiments of the present principles provide better network policy scalability in network policy rule management as the number for hosted containers increases, as well as greater dynamic control of the container ecosystem as containers are dynamically instantiated and removed.

Embodiments of the present principles comprise a manager and per-container network stacks. The manager determines/solicits network and policy information from active containers, and, in some embodiments, deploys a security enforcement network stack into each container. Then, in the network stack, all security enforcement is conducted through two major security services: a network visibility service and a traffic visibility service. Based on a set of inter-container dependencies, the network visibility service mediates the container discovery process, filtering out any access to containers and hosts that are deemed irrelevant given the dependency map. That is, in at least some embodiments, the network visibility service provides fine-grained control over the visible network topology per container application. The traffic visibility service controls network traffic between the container and other peer containers, while also verifying the sources of the traffic. That is, in at least some embodiments, the traffic visibility service securely isolates and forwards inter-container traffic in a point-to-point manner, preventing the exposure of this traffic to other peer containers. Such embodiments of the present principles enable traffic to flow among the containers through an efficient forwarding mechanism that also isolates network communications between senders and recipients. When there is a change in container environments, the manager dynamically updates the network stack of each container without any service interruption.

Embodiments of the present principles overcome deficiencies of the prior art by defining design considerations including, but not limited to, at least one or any combination of the following:

R1: Container-aware least privilege communications enforcement. A container's connectivity can be a function of the inter-dependencies between itself and those containers with which communications are required to compose a system or service.

R2: Scalable and fine-grained network policy expression. Network policy expression and enforcement performance within the container network can scale well to the dynamism and size of modern host container topologies.

R3: Policy control over intra-container communications. While the gateway interface plays as a key role in the communications with external networks, the network stack can filter out the direct access of the gateway interface to prevent the abuse of the host namespace.

R4: Policy enforcement for network-privileged containers. Network policy enforcement can be capable of fine-grained access control over network-privilege enabled containers that share the host network namespace for the direct access of the host interfaces.

R5: Unauthorized eavesdropping and spoofing prevention. Communication mediation can prevent access to third-party packets (i.e., eavesdropping) and false packet header production (preventing both Address Resolution Protocol (ARP) spoofing and traffic injection among local containers).

R6: Competitive performance that scales well with any container topology. The network stack can deliver low latency and high throughput communications while securing container networks.

Figure 2:
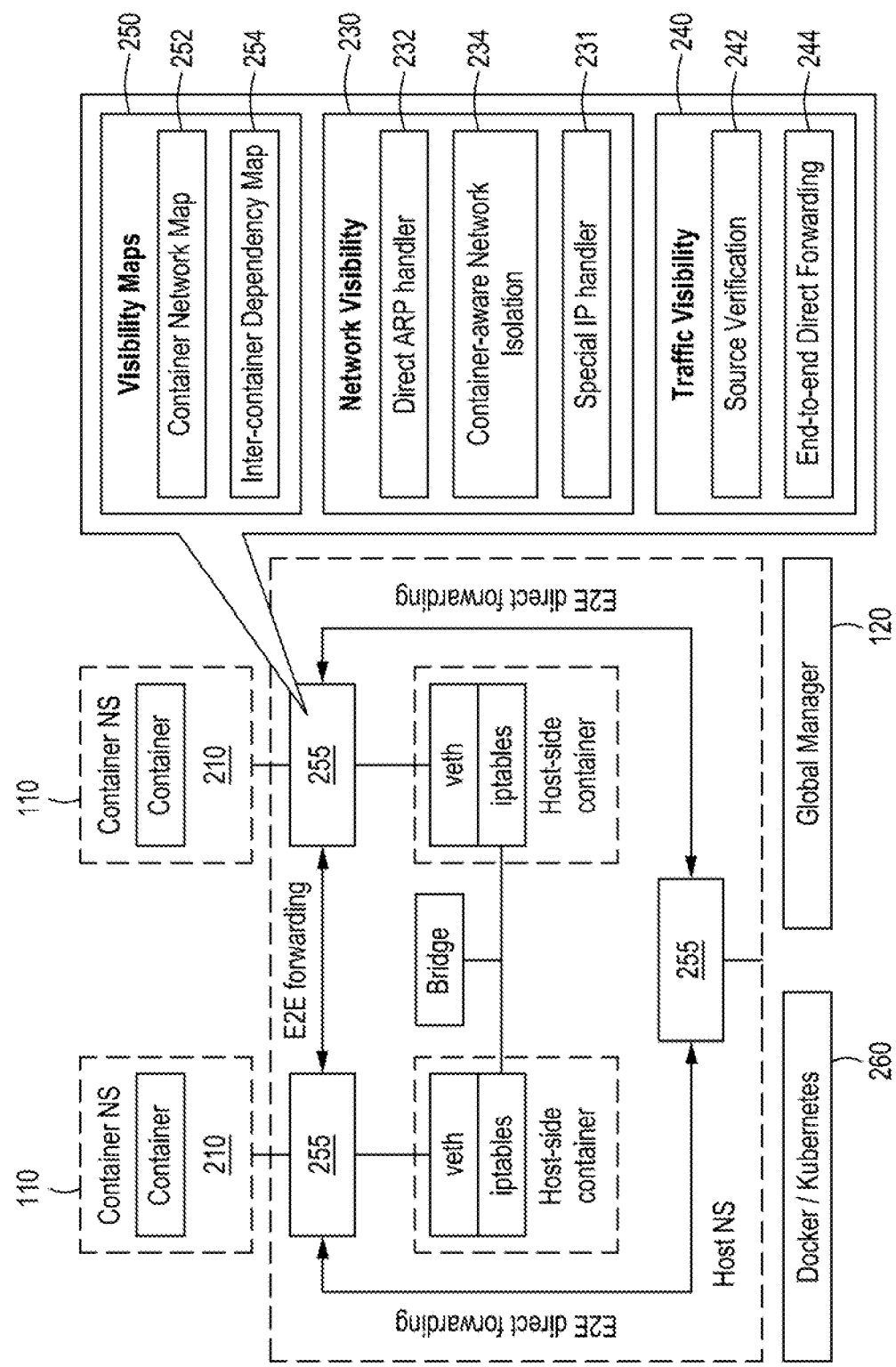
FIG. 2 depicts a high-level diagram of a functional architecture of a container security system in accordance with an embodiment of the present principles.

FIG. 1 depicts a high-level block diagram of a container security system (CSS) 100 in accordance with an embodiment of the present principles. The container security system (CSS) 100 of FIG. 1 illustratively comprises a plurality of network stacks 1101-110N (collectively network stacks 110), at least one network stack for each container of a container network (not shown), and a global manager 120. In the embodiment of the container security system 100 of FIG. 1, each network stack 110 contains/is provided a network visibility service/module (NVS) 130 and a traffic visibility service/module (TVS) 140, described in greater detail below. Although in the embodiment of the container security system 100 of FIG. 1, each network stack 110 is illustrated as comprising a NVS 130 and a TVS 140, alternatively or in addition, in some embodiments of a container security system of the present principles, the NVS 130 and/or the TVS 140 can be services/modules provided externally to each network stack 110 and do not have to reside within each network stack 110 as illustrated in FIG. 1. For example, FIG. 2 depicts an architecture of a container security system of the present principles in which the NVS 130 and/or the TVS 140 are provided externally to each network stack 110 (described in greater detail below). As depicted in FIG. 1, embodiments of a container security system of the present principles, such as the container security system 100 of FIG. 1, can be implemented in a computing device 1400 in accordance with the present principles (described in greater detail below with reference to FIG. 14.

In some embodiments, the global manager 120 comprises two logical portions; a container collection portion 122 and a network stack management portion 124. For container collection, the global manager 120 periodically captures the attributes (e.g., NetworkSettings) of active containers from, for example, a Docker engine and a Kubernetes manager (described in greater detail with respect to FIG. 2). In terms of explicit inter-container dependencies, in some embodiments the global manager 120 utilizes specific keywords (e.g., "link" and "depends on" that the Docker platform provides). In the case of Kubernetes, the global manager 120 does not have a way to explicitly define inter-container dependencies thus, the global manager 120 utilizes labels, which are used to specify the identity of Kubernetes elements (e.g., containers), to define explicit inter-container dependencies (e.g., "labels: dependency: service"). In terms of security policies, the global manager 120 extracts such policies not only from iptables in a host but also using "ingress" and "egress" keywords based on the labels for each container. Then, when a new container is created, the global manager 120 launches a new management thread specific for each container, and the management thread separately installs a security enforcement network stack for its container with maps filtered for the container and manages it. In some embodiments, during the installation, the management thread uses the toolkit of a Berkley Packet Filter (BPF) compiler collection.

In some embodiments, the network stack 110 for each container in the container security system 100 of FIG. 1 can be implemented using extended Berkley Packet Filter (eBPF) and express data path (XDP) on the Linux kernel, and the security services in the network stack inspect raw incoming packets in the xdp and structure provided by XDP. In some embodiments, during the inspection, two hash maps are retrieved (i.e., the container network and inter-container dependency maps), and these maps are synchronized with the maps in a corresponding management thread of the global manager 120 using BPF syscalls. Then in some embodiments, three types of XDP actions can be used: 'XDP TX' sends a packet back to the incoming container (the direct ARP handler), ADP REDIRECT' injects a packet into the transmit queue of a destination (the end-to-end direct forwarding), and 'XDP DROP' drops packets.

As described above, embodiments of the present principles implement a decentralized, per-container, network stack in which security enforcement occurs before a container's packets are delivered into the container network. Such embodiments provide individualized control over the network traffic coming from each container. For example, FIG. 2 depicts a high-level diagram of a functional architecture of a container security system of the present principles such as the container security system 100 of FIG. 1. The embodiment of the architecture of the container security system of FIG. 2 is illustratively depicted as a security service 200 provided by a container security system of the present principles provided for securing communications between containers 110 of a container network (not shown) and between the containers 110 and host containers 290. The architecture of the container security system of FIG. 2 illustratively comprises a network stack 110 for each container 210, a global manager 120 that maintains the global view of container networks, and a security service 200 providing a network visibility service 230 that controls container reachability, a traffic visibility service 240 that controls inter-container traffic while concealing irrelevant traffic from containers and visibility maps 250. FIG. 2 further illustratively comprises two host containers 290, each including iptables 292 and respective Virtual Ethernets (veths) 294. The bridge 296 provides intercommunication between the hosts 290.

In the embodiment of FIG. 2, the network stack 110, in some embodiment via the security service 200, maintains the container network map 252 for the corresponding container, which includes the network information of all reachable containers that have peer dependencies (e.g., a microservice composition map), and an inter-container dependency map 254, including the security policies on dependent containers. When packets arrive at the network stack 110, the network visibility service 230 via the container security service 200 proactively filters any discovery processes of irrelevant containers by, in some embodiments, dealing with Address Resolution Protocol (ARP) requests based on the container network map 252 (R1, R5), and restricts the communications between containers according to security policies specified in the inter-container dependency map 254 (R1). In the embodiment of FIG. 2, the direct ARP handler 232 filters out any unnecessary container discovery that does not pertain to a present container's dependency map (described in greater detail below). The direct ARP handler 232 does not address malicious accesses among dependent containers, however. As such, to further restrict the reachability of containers, a second network visibility component 234 implements container-aware network isolation (described in greater detail below) In addition, in the embodiment of FIG. 2 a special, IP-handler 231 of the network visibility service 230, via the container security service 200, restricts unauthorized accesses to special IP addresses (e.g., gateway IP addresses) (R3).

In the embodiment of FIG. 2, the traffic visibility service 240, via the container security service 200, conducts secure packet-forwarding between containers. The traffic visibility service 240 first verifies the packets with the identity of the container via source verification 242 (R4-5). The traffic visibility service 240 then directly passes packets from the source container to the destination containers using their interface address via direct forwarding 244 (described in greater detail below). Since the direct packet forwarding occurs at the network interface level, packets are no longer passed through the container network (R5-6), thus eliminating any chance for unauthorized network traffic exposure (even to network-privileged containers) (R4).

Referring back to FIG. 2, in some embodiments, for cross-host inter-container communications, a specialized network stack 255 is utilized at the external interface of each node. Unlike the network stack 110 for containers 210, the specialized network stack 255 maintains the container network map for all containers deployed in each node. Since all security decisions are already made when packets enter the network stack of each container, a simple secure forwarding is conducted from the external interface to destination containers. Physical links among hosts (nodes) are beyond the coverage of the container security system, thus it utilizes existing overlay networks (e.g., a Weave network over IPSec). Also, in some embodiments container security systems of the present principles retain the existing mechanisms of container platforms to handle inbound traffic from external networks.

In the embodiment of FIG. 2, the global manager 120, performs two primary roles: the global manager 120 collects the network information of all active containers from container platforms and manages the network stacks deployed to the active containers. In some embodiments, for container collection, the global manager 120 first maintains two hash maps (i.e., a global container network map 252 and the inter-container dependency map 254 of all containers) for the security evaluation of each container. In some embodiments and as depicted in FIG. 2, a container security system of the present principles, such as the container security system 100 of FIGS. 1 and 2, uses a container platform 260, such as Docker or Kubernetes, to retrieve the network information (e.g., container ID, container network—the identity of a microservice, container set—the identity of a container set for a specific functionality, host-side network interface, and IP and MAC addresses) for all containers, and to build the inter-container dependency map by extracting the dependencies among containers based on the retrieved information and their ingress/egress security policies. In addition, because containers can be dynamically spun up and down, the global manager 120 periodically retrieves the network information to update the maps. In some embodiments, a polling-based mechanism is selected to provide a transparent and compatible solution that can be integrated with already-deployed container environments without any required modifications.

In some embodiments, a container security system of the present principles automatically extracts dependencies among containers. To do this, a container network model is defined, in which a microservice group is composed of one or more container sets, and each container set has one or more containers that play the same role (due to scaling and load-balancing). Each container set exposes internal service ports to communicate with other container sets, while a microservice exposes global service ports to redirect accesses from the outside world to some of internal service ports. In such embodiments, there can exist four constraints in inter-container communications for implicit inter-container dependencies: (1) containers with the same container set are granted interconnectivity, (2) containers in different container sets communicate via internal service ports (explicitly exposed by configurations), (3) containers that are unrelated may talk with each other through global service ports, and (4) all other communications are dropped by default.

In some embodiments of a container security system of the present principles, inter-container dependencies can be extracted using the algorithm 300 of FIG. 3. In the algorithm 300 of FIG. 3, first, operator-specified policies are used to build the initial dependency map by intersecting the ingress and egress policy of each container in the container network, representing the least-privilege connectivity policy. Next, the algorithm 300 finds implicitly-dependent containers based on constraints. For containers of the same container set (i.e., constraint 1), the global manager 120, according to the algorithm 300, adds the containers into the dependency map as explicitly dependent containers. Containers belonging to different container sets in the same microservice group (constraint 2) are added to the map, by intersecting the egress policies of each container with the internal service ports of other container sets. Lastly, for cross microservice-group communications (constraint 3), the global manager 120, according to algorithm 300, adds the representative IP addresses for other microservices (virtual IP addresses to access the microservices) into the map by intersecting the egress policies of each container with their global service ports. Finally, the algorithm 300 aggregates the inter-container dependency maps for all containers.

In some embodiments, a container security system in accordance with the present principles can discover inter-container dependencies and network policies. For example, as no container network can be made secure without proper network policies that restrict communications to the minimum required access, in some embodiments, a global manager of the present principles, such as the global manager 120 of FIGS. 1 and 2, is able to discover inter-container dependencies not explicitly defined by a container operator. For example, during the flow control of inter-container traffic, a global manager of the present principles can monitor traffic and produce network logs that capture the network accesses from/to containers. At the same time, the global manager can compare the created logs with the inter-container dependency map, classifying the logged information of the containers into three cases: legitimate accesses, missing policies, and excessive policies. If for a subject communication, a pair of observed containers are not in the precomputed inter-container dependency map, the global manager of the present principles can consider that there is either a missing network policy or an invalid access. In some embodiments, the global manager of the present principles can then cause a communication to be sent to, for example, a network operator to cause a review of specific network policies to determine whether new network policies should be created to authorize identified flows/accesses that do not already exist in current network policies. Alternatively or in addition, in some embodiments, a global manager of the present principles can be configured to automatically determine whether or not additional network policies should be added to accommodate additional repeated access attempts based on, for example, in some embodiments, a frequency of a same attempt.

Similarly, in some embodiments, a global manager can identify network policies for which no flows have been encountered. Such instance can represent an over-specification of policies that enable unnecessary flows for the container network's operations. In these instances, the global manager of the present principles can then cause a communication to be sent to, for example, a network operator to cause a review of specific network policies to determine whether network policies that already exist but are not being used should be removed. Alternatively or in addition, in some embodiments, a global manager of the present principles can be configured to automatically determine whether or not network policies should be removed based on, for example, in some embodiments, how long it has been since a policy has been used.

As described above, in some embodiments, a global manager of the present principles can monitor traffic of containers in container networks and produce network logs that capture the network accesses from/to containers. In such embodiments, the global manager can determine network and policy information of the container networks from the network logs and can determine a least privileged communication policy for the plurality of containers from the determined network and policy information. That is, in some embodiments a global manager of the present principles is able to determine a security concept in which containers of a container network are given the minimum levels of access/ permissions needed to perform a respective job function. The global manager can then configure container access in the container networks to be limited to only containers of the plurality of containers that are relevant to a respective communication based on the determined least privileged communication policy. The global manager can further configure inter-container traffic in the container networks to be directed only from a source container into at least one destination container in a point-to-point manner such that exposure of the inter-container traffic to peer containers is prevented.

Figure 16:
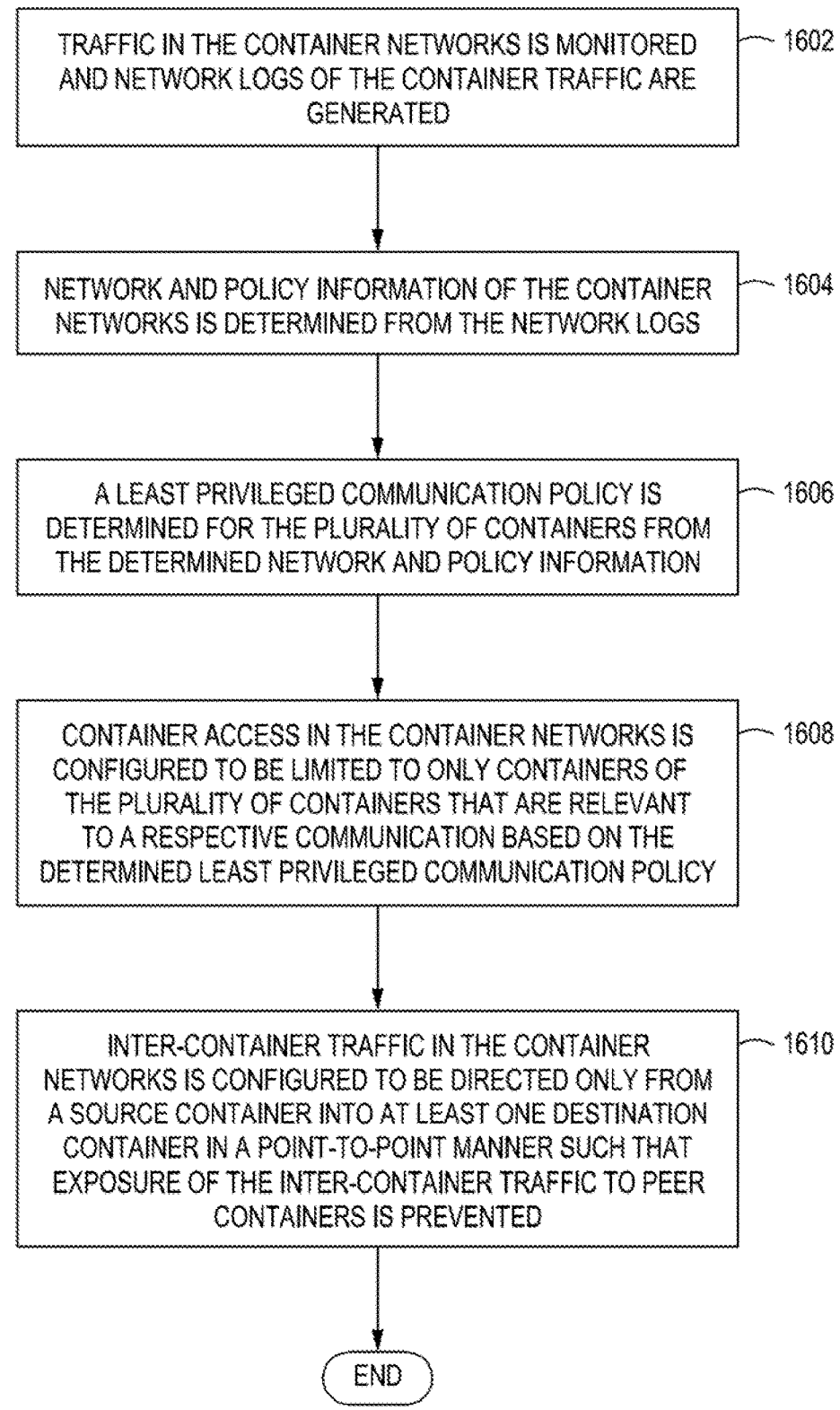
FIG. 16 depicts a flow diagram of a method for providing least privileged security for container networks having a plurality of containers in accordance with an embodiment of the present principles.

FIG. 16 depicts a flow diagram of a method 1600 for providing least privileged security for container networks having a plurality of containers. The method 1600 can begin at 1602 during which traffic in the container networks is monitored and network logs of the container traffic are generated. The method 1600 can proceed to 1604.

At 1604, network and policy information of the container networks is determined from the network logs. The method 1600 can proceed to 1606.

At 1606, a least privileged communication policy is determined for the plurality of containers from the determined network and policy information. The method 1600 can proceed to 1608.

At 1608, container access in the container networks is configured to be limited to only containers of the plurality of containers that are relevant to a respective communication based on the determined least privileged communication policy. The method 1600 can proceed to 1610.

At 1610, inter-container traffic in the container networks is configured to be directed only from a source container into at least one destination container in a point-to-point manner such that exposure of the inter-container traffic to peer containers is prevented. The method 1600 can be exited.

In embodiments in accordance with the present principles and with reference to at least the embodiment of FIG. 2, as described above the global manager 120 maintains the network stack 110 for each container. For newly spawned containers, the global manager 120 installs the network stacks 110 at the interfaces using the container network 252 and inter-container dependency maps 254. With respect to map size, each container only requires a part of the network information to communicate with dependent neighbors, while the global manager 120 maintains the entire network information of all deployed containers. Thus, to optimize the size of security services, in some embodiments a container security system of the present principles filters irrelevant information per container. The global manager 120 also performs change detection of inter-container dependencies, automatically updating the network stack maps of the corresponding containers.

As recited above, the network visibility service 230 restricts unnecessary connectivity among containers and between containers and external hosts. In some embodiments, for inter-container networking, discovery is the first step to identify other containers communication targets. In some embodiments, containers can use ARP requests to identify the necessary network information (i.e., MAC addresses) of target containers. The direct ARP handler 232 of the network visibility service 230 filters out any unnecessary container discovery that does not pertain to the present container's dependency map. When a container sends an ARP request, the direct ARP handler 232 intercepts the request before the request is broadcasted, verifying that the source container has a dependency on the destination container. In some embodiments, the analysis is done using the inter-container dependency map 254. If accessible, the direct ARP handler 232 generates an ARP reply with the given MAC addresses of a destination container in the container network map and sends the reply back to the source container. Otherwise, the direct ARP handler 232 simply drops the request.

Although the direct ARP handler 232 prevents containers from performing unbounded topology discovery, the coverage is limited to container-level isolation. The direct ARP handler 232 does not address malicious accesses among dependent containers. As such, to further restrict the reachability of containers, a second network visibility component 234 implements container-aware network isolation.

Figure 4A:
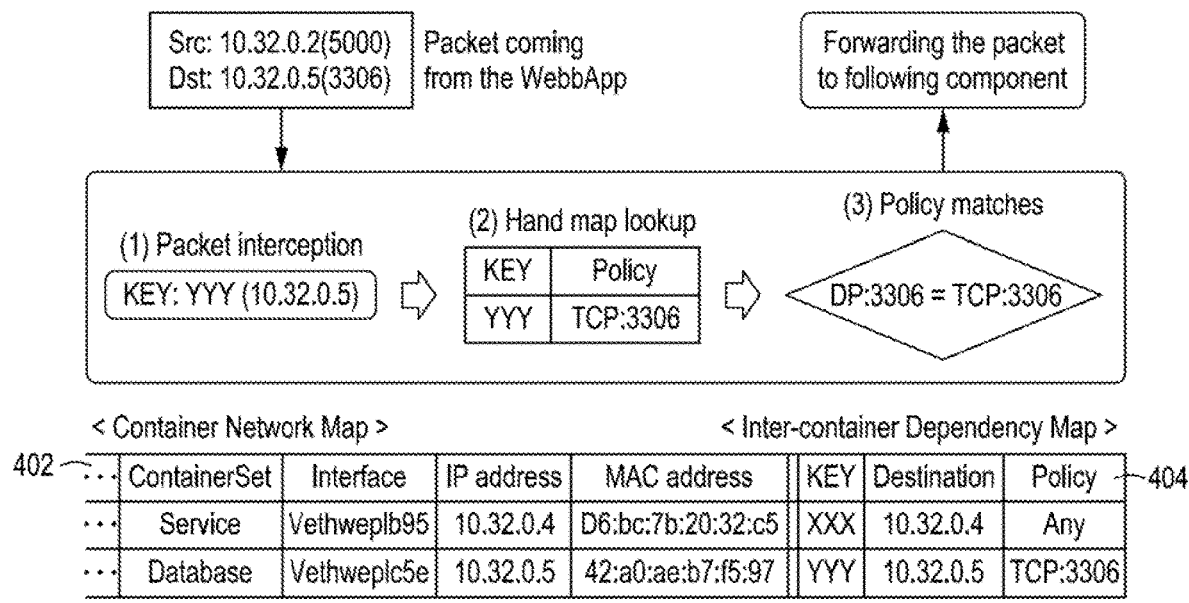
FIG. 4A depicts a high-level exemplary workflow diagram 400 for implementing container-aware network isolation in accordance with an embodiment of the present principles.

FIG. 4A depicts a high-level exemplary workflow diagram 400 for implementing container-aware network isolation in accordance with an embodiment of the present principles. The workflow diagram 400 of FIG. 4A depicts an interdependence between WebApp containers and Database containers. That is, in the embodiment of FIG. 4A, the WebApp container accesses a service of a Database container of a container network depicted in FIG. 4B.

Figure 4B:
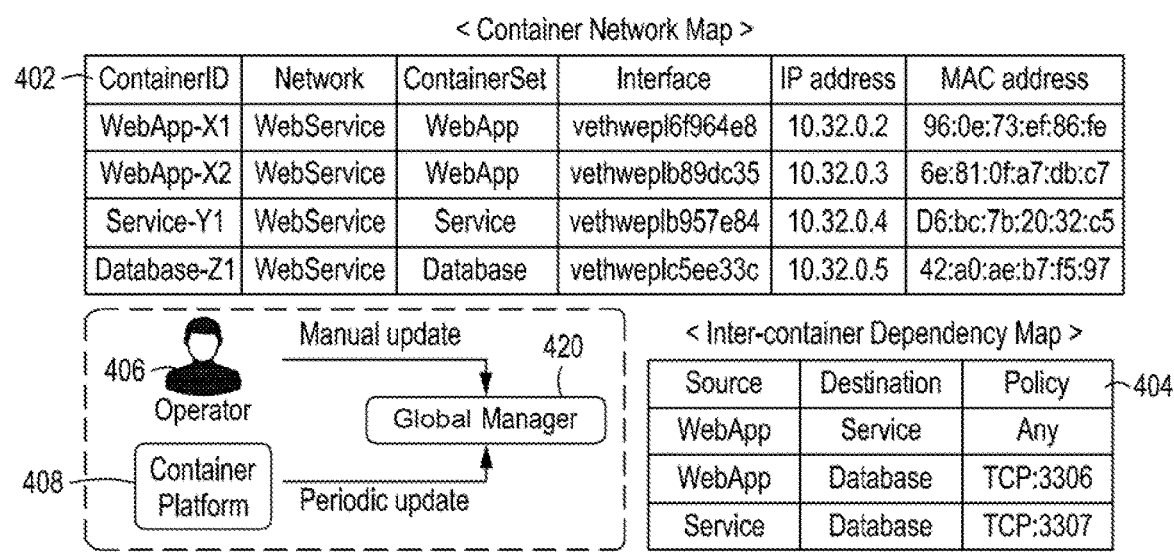
FIG. 4B depicts a container network map that captures network interface attributes for each hosted container, and an inter-container dependency map that indicates the links and dependencies between containers in accordance with an embodiment of the present principles.

That is, as depicted in FIG. 4B, a container security system of the present principles computes a container network map 402 that captures network interface attributes for each hosted container, and an inter-container dependency map 404 that indicates the links and dependencies between containers. For example and as depicted in the embodiment of FIG. 4B, an operator 406 of, for example, a Container Network 408 can communicate a command to the global manager 420 to cause the global manager 420 to compute/update at least one of the container network map 402 and the inter-container dependency map 404. As also depicted in FIG. 4B, in some embodiments the global manager 420 can be configured to compute/update at least one of the container network map 402 and the inter-container dependency map 404 on a periodic basis.

Returning to FIG. 4A, the WebApp's network stack includes only the Container Network Map 402 and the Inter-Container Dependency Map 404 for the WebApp itself. In mediating the WebApp's packets, a container security system of the present principles can first intercept an incoming packet from the WebApp in step 1. The container security system of the present principles can then check the dependency between the WebApp and the destination by examining the inter-container dependency map using the destination IP address as a key. That is, at step 2, in some embodiments, the container security system of the present principles can perform a Hash map lookup. If any policies exist in the map, it can be concluded that the WebApp has a dependency on the destination—in this case the Database. The connection is allowed if matched to the policy for the database container, otherwise it is dropped. That is, at step 3, the container security system of the present principles can perform policy matches.

While some embodiments of the present principles employ sequential matching, alternatively or in addition, other matching algorithms (such as a bloom filter) can be implemented in accordance with the present principles. The above described embodiments offer both streamlined per-container policy specification and a minimized policy enforcement performance impact, as the match set is container-specific rather than host-global specific, as occurs with iptables. Further, while iptables is dependent on static policies, the container-aware network isolation of the present principles is implemented through dynamic policies based on the dependency map that maintains the up-to-date information about the dynamically changing container network environment with no service interruption.

As recited above with respect to FIG. 2, the special, IP-handler 231 of the network visibility service 230 filters direct host accesses. When a network connection targets non-local container addresses, it includes the gateway MAC address of its network and the IP address of the actual destination. The IP-handler 231 of the network visibility service 230 of a container security system of the present principles, such as the container security system 100 of FIG. 1, blocks any direct host accesses by, in some embodiments, checking if both IP and MAC addresses belong to the gateway. It should be noted that a network flow might alternatively access the gateways of other container networks since these gateways are connected to the host network. As a result, in some embodiments of the present principles, the IP-handler 231 also filters unauthorized host accesses by comparing the IP and MAC addresses of incoming packets with all gateway information.

In Kubernetes environments, there is an additional special service IP address. Service IP addresses are virtual IP addresses used for the redirection to actual containers. However, since those IP addresses do not belong to container networks, they can be considered as external IP addresses. As such, in some embodiments of the present principles, the pairs of {service IP address, port} and {corresponding container IP address, port} are additionally extracted from the NAT table of iptables managed by Kubernetes, and a service map is maintained in each network stack of the present principles. Then, when a container sends a packet with a service IP address and a service port, the special, IP-handler 231 of the network visibility service 230 overwrites the service IP address and port to an actual container IP address and port according to the service map. If there are multiple containers mapped to a single service, a container is selected based on the hash of the source IP address and port. As a result, all inter-container communications can be conducted with the existent IP addresses in container networks.

Figure 5A:
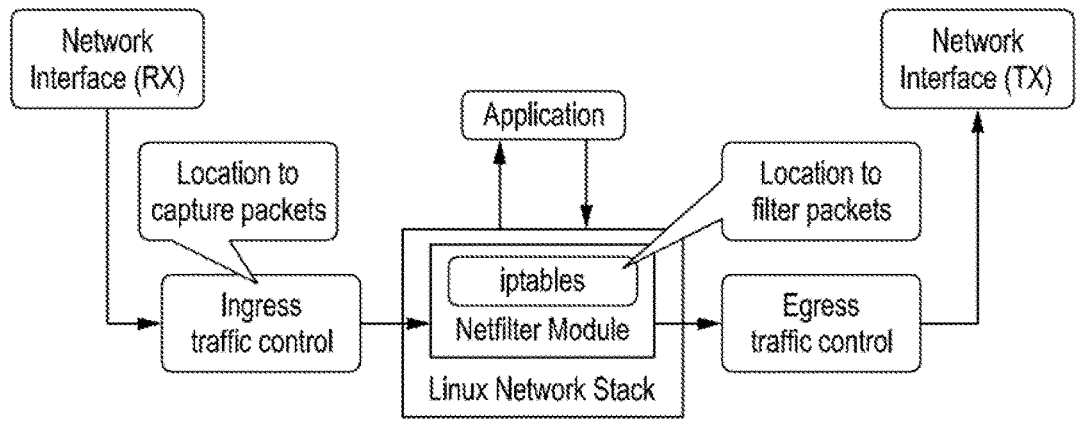
FIG. 5A depicts an overview of a prior art packet processing sequence performed within a Linux kernel.

FIG. 5A depicts an overview of a prior art packet processing sequence performed within a Linux kernel. In the embodiment of FIG. 5A, when a packet arrives at an interface, the packet is first delivered to an ingress traffic control. Subsequently, the packet passes through the actual network stack, and is ultimately delivered to the application once it has been processed through filter checks. When an application sends a packet, the packet is delivered to the interface in reverse. To control the traffic visibility, both where to filter and capture packets must be considered. The answer of the first question (i.e., where to filter packets) is in the network stack. Network traffic can be filtered using, for example, Netfilter located in the network stack. Netfilter is composed of multiple match tables across networking layers (e.g., ebtables for L2 traffic and iptables for L3/L4 traffic). Thus, security policies (e.g., DROP) can be applied to network traffic by adding them into the corresponding match tables at each layer. Because packets that violate a security policy are already handled in a network stack, applications will not receive them.

The answer to the second question (i.e., where to capture packets) is in the ingress and egress traffic controls. When network traffic is captured, packet capturing tools (e.g., tcpdump) are used. Such tools internally create Berkeley Packet Filter (BPF) filters and inject them into the traffic controls. Using the BPF filters, network traffic cloned and selectively retrieved. As such, the packets, even those dropped by netfilter, can be monitored. A deficiency of the prior art packet processing sequence performed within a Linux kernel as depicted in FIG. 5A and other network stack functions incudes that all security enforcement and packet forwarding rely on packet-header information. Thus, a malicious container can submit packets that match the identity of target containers. By doing so, it can redirect the traffic of a target container to itself (e.g., ARP spoofing attack). Also, the malicious container can modify the traffic passing through (e.g., Man-In-the-Middle attack) or inject forged packets to disrupt another container's existing sessions (e.g., TCP RST attack).

To prevent the deficiencies described above, embodiments of the present principles conduct source verification of inter-container traffic. In some embodiments of the present principles, such as the container security system 100 of FIG. 1, the network stack of each container of the present principles statically contains the container information (i.e., IP and MAC addresses) of the corresponding container. In some embodiments, a traffic visibility service of the present principles, such as the traffic visibility service 240, verifies the incoming traffic by comparing its packet header information with the container information embedded in the network stack. If the packet information does not match the container information, the incoming traffic is considered as having been spoofed and the traffic is immediately dropped. Alternatively or in addition, in some embodiments of the present principles, the kernel metadata of incoming packets (e.g., ingress network interface index) is leveraged to conduct source verification of inter-container traffic. In such embodiments of the present principles, the traffic visibility service of the present principles, such as the traffic visibility service 240, verifies the incoming traffic by comparing not only the packet header information but also the metadata to the container's information. If the packet information and/or the metadata does not match the container information, the incoming traffic is considered as having been spoofed and the traffic is immediately dropped.

The effectiveness of the source verification comes from its fidelity to verify the origins of incoming packets. As a result, embodiments of the present principles effectively eliminate the spectrum of disruption and spoofing threats in container environments. Existing solutions, such as the prior art packet processing sequence of FIG. 5A, are limited to observe where incoming packets come from via the packet header information. As depicted in FIG. 5A, prior art network stacks cannot prevent the exposure of inter-container traffic from other containers as the filter position is behind the capture point. Thus, if a malicious container has a capability to redirect the traffic of a target container to itself, the malicious container can monitor the traffic without restriction. Furthermore, network-privileged containers have the full visibility of all container networks. As described above, to address such deficiencies, embodiments of the present principles implement least-privilege traffic exposure by providing an end-to-end direct forwarding component.

Figure 5B:
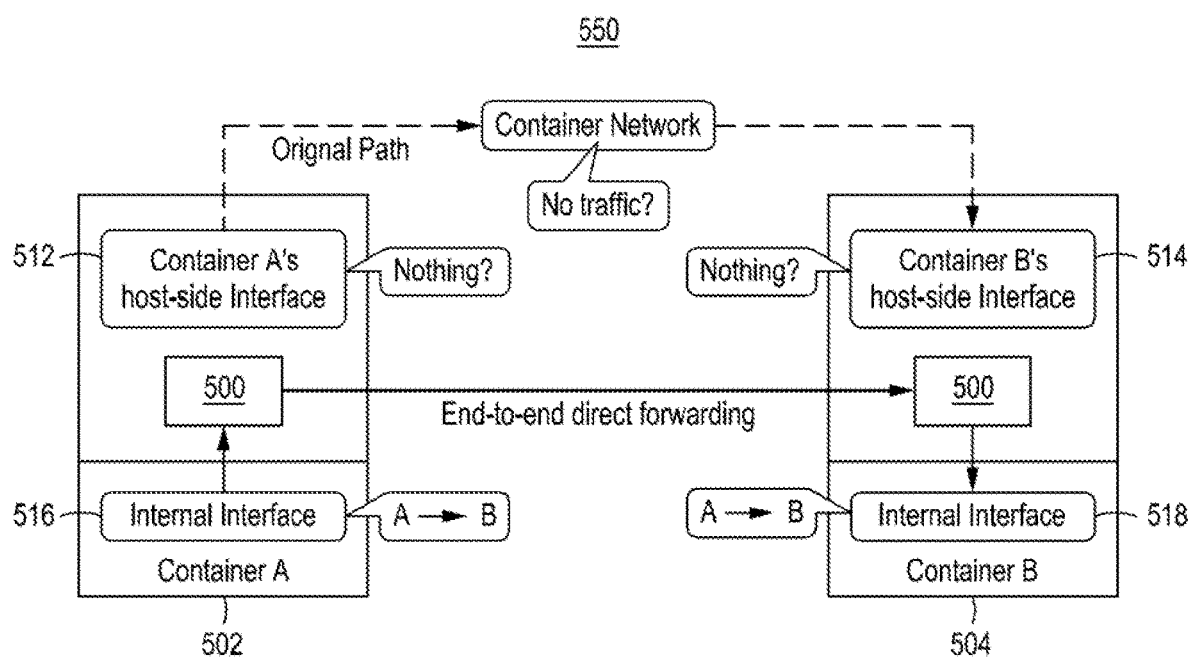
FIG. 5B depicts a high-level functional block diagram of an end-to-end direct packet forwarding process in accordance with an embodiment of the present principles.

FIG. 5B depicts a high-level functional block diagram of a container network 550 including an end-to-end direct packet forwarding process in accordance with an embodiment of the present principles. In some embodiments, the process of FIG. 5B of the present principles is implemented to bypass exposure of intra-container traffic to other containers by bypassing not only original network stacks but also bridge interfaces thus preventing eavesdropping by peer containers. In the embodiment of FIG. 5B, when a container security system of the present principles, such as the container security system 100 of FIG. 1, receives an incoming network connection from a container, the container security system retrieves the interface information of a destination from the container network map. If the destination is a container in the same node, the container security system injects the packet stream into the destination container. For example, in the embodiment of FIG. 5B a container security service 500 of the present principles is implemented in each of container A 502 and container B 504. In contrast to the communication protocol in FIG. 5A, in the embodiment of FIG. 5B, a communication from container A 502 to container B 504 is not completed using container A's host side interface 512 to container B's host side interface 514 and is instead directly forwarded from an internal interface 516 of container A 502 to an internal interface 518 of container B 504 by the container security service 500 of the present principles. In accordance with the present principles, in some embodiments, if the destination of a communication from at least one of container A 502 and container B 504 is a container in another node, the packet is injected by the service 500 of the present principles to the external interface of a host (not shown). Once a network stack of the external interface at the target node receives the packet, the network stack directly injects the packet stream into the destination container. This traffic flow isolation in accordance with the present principles prevents both traffic disclosure and injection by other containers, preventing even network-privileged containers to view third-party traffic flows.

Figures 6, 7A, 7B:
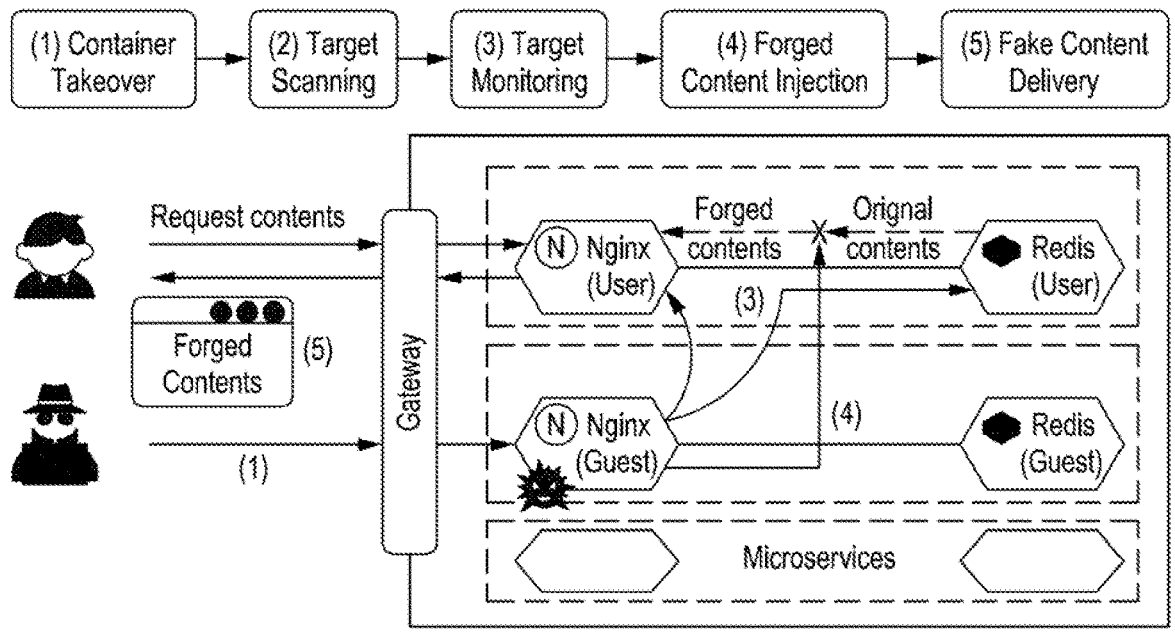
FIG. 6 depicts a high-level block diagram of a prior art Kubernetes environment in which a security attack is taking place.
FIG. 7A depicts packet data from containers of a container network collected by an attacker of the Kubernetes environment of FIG. 6 probing neighbor containers.
FIG. 7B depicts an example of fake ARP responses put into the network of FIG. 6 by an attacker.

FIG. 6 depicts a high-level block diagram of a prior art Kubernetes environment in which a security attack is taking place. In the Kubernetes environment of FIG. 6, two independent services are deployed along with common microservices. In FIG. 6, one is being implemented as a service for legitimate users, and the other service is a service for guest users. In the Kubernetes environment of FIG. 6, Nginx and Redis container images retrieved from Docker Hub are used. In the Kubernetes environment of FIG. 6, a compromised container from one service conducts a series of network attacks to hijack communications between other containers in a peer service. In this scenario, an attacker forges legitimate user requests, after infiltrating into the public-facing Nginx server by exploiting web application vulnerabilities. The attacker can then download statically-compiled attack binaries into the /tmp directory, which has global read and write permissions for all processes.

In the Kubernetes environment of FIG. 6, the attacker leverages three network-based attacks to compromise the Nginx-Guest container and successfully execute a man-in-the-middle attack. In the first step, the attacker discovers active containers around the network through ARP-based scanning. Since in the Kubernetes environment of FIG. 6 all containers are connected to an overlay network and ARP packets are not filtered by iptables, the attacker can easily collect the network information of containers.

Figures 7C, 7D, 8:
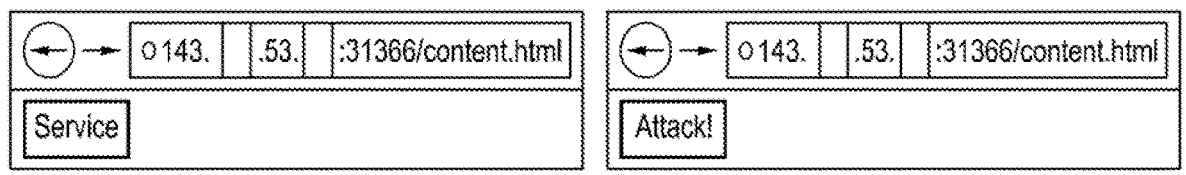
FIG. 7C depicts an example of traffic between the Nginx-User and the Redis-User being monitored by the attacker in the network of FIG. 6.
FIG. 7D depicts an example of forged packets injected into the Nginx-User of FIG. 6 by the attacker.
FIG. 8 depicts an illustration of packet data resulting from network isolation in accordance with an embodiment of the present principles.

For example, FIG. 7A depicts network information collected from containers by an attacker of the Kubernetes environment of FIG. 6 probing neighbor containers (i.e., Nginx-Guest's view). In the Kubernetes environment of FIG. 6, the attacker can then inject fake ARP responses into the network to make all traffic between the Nginx-User and the Redis-User containers pass through the Nginx-Guest. For example, 7B depicts an example of fake ARP responses put into the network of FIG. 6 by an attacker. That is, in FIG. 7B it can be seen that the MAC address of the Redis-User in the ARP table of the Nginx-User is replaced with that of the Nginx-Guest. The attacker is then able to monitor all traffic between the Nginx-User and the Redis-User. For example, FIG. 7C depicts an example of traffic between the Nginx-User and the Redis-User being monitored by the attacker in the network of FIG. 6.

In the Kubernetes environment of FIG. 6, the attacker is able to replace the responses for the legitimate user with forged content. For example, the attacker can internally drop the packets delivered from the Redis-User and can inject new packets with forged contents. The Nginx-User then processes the forged contents instead of the original ones and returns the results back to the user. For example, FIG. 7D depicts an example of forged packets injected into the Nginx-User of FIG. 6 by the attacker. In the end, the user receives forged contents as the attacker intended.

When a compromised container is used to conduct peer discovery to locate other containers, as shown in FIG. 7A, the current container network stack enables an attacker to discover all neighboring containers without any restrictions. It can also be observed that the Weave overlay network in a Kubernetes environment enables containers to discover all containers in other nodes, as they are logically located in a single switch.

In contrast to the prior art Kubernetes environment of FIG. 6 and FIGS. 7A-7D, FIG. 8 depicts an illustration of packet data resulting from network isolation in accordance with an embodiment of the present principles. The direct ARP handler and container-aware network isolation architecture of the present principles reduce the reachability of each container based on each container's dependencies (R1). As depicted in the network information of FIG. 8, as a result of the architecture of the present principles, the infected container (i.e., Nginx-Guest in FIG. 6) would only have one dependent container, and the container observes only its gateway and that dependent container.

For example, FIG. 9A depicts an example of the traffic that an attacker can see of the spoofed target container of FIG. 6 without the end-to-end forwarding of the present principles. That is, as depicted in FIG. 9A, a compromised container may be able to sniff the network traffic of a target container. Further, when an attacker compromises a "network-privileged" container, the attacker is provided access to all network traffic, with no restriction.

In contrast, FIG. 9B depicts packet data exemplifying how an attacker cannot see response traffic with the end-to-end forwarding of the present principles. As depicted in FIG. 9B, when direct forwarding is applied in accordance with the present principles, the only visible traffic from a given interface is that of traffic involving the container itself (R4-5). To highlight the differences, in FIG. 9B the traffic flow from a source to a destination is intentionally made visible. As a result, while an attacker can observe the source-to-destination flow, the attacker can no longer observe the traffic in the reverse direction. If end-to-end forwarding in accordance with the present principles is fully applied for all traffic, the attacker will see no traffic between them.

Figures 10D, 11:
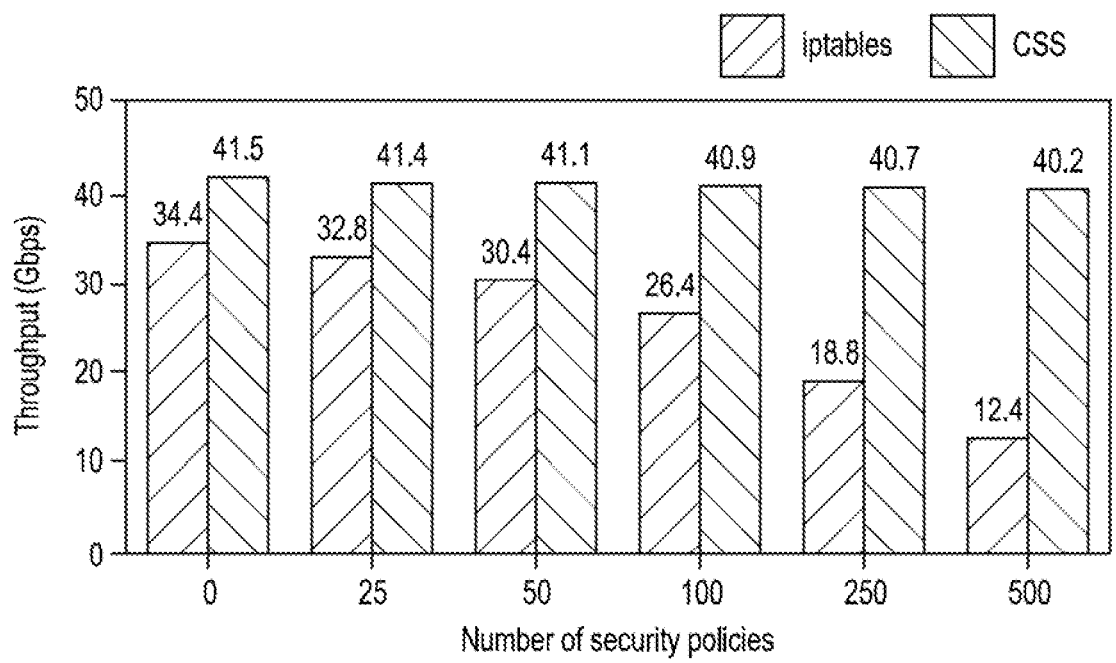
FIG. 10D depicts packet data depicting how an attempt of an attacker of FIG. 10C to inject RST packets into a container of a container network implementing source verification in accordance with an embodiment of the present principles is thwarted by embodiments of the present principles.
FIG. 11 depicts a graphical representation of inter-container throughput variations with an increasing number of security policies within a host for both an iptables-based access control network and a network controlled using a container security system in accordance with an embodiment of the present principles.

Network-based attacks frequently rely on spoofed packet injection techniques to send malicious packets to target containers. A container security system of the present principles, such as the container security system 100 of FIG. 1, prevents these attacks by performing explicit source verification. To further illustrate an advantage of embodiments of the preset principles, FIGS. 10A-10D depict packet data resulting from another attack scenario and specifically before and after cases from the perspectives of an attacker and a victim. FIG. 10A depicts packet data showing the injection of RST packets by an attacker into a container of a container network having a prior security architecture. In the container network of FIG. 10A, source verification is only enabled at the IP-level and an attacker is able to conduct ARP spoofing attacks without the source verification of the present principles. As depicted in FIG. 10A, the attacker spoofs the Nginx-User and receives the traffic of the Nginx-User. Further, the attacker injects RST packets to terminate the session of the Nginx-User. FIG. 10B depicts how the injection of RST packets into a container by the attacker causes session termination from the point of view of the Nginx-User. That is, as depicted in FIG. 10B, as soon as the attacker injects the RST packets, the Nginx-User receives the injected RST packets (see the received times of the RST packets), causing the session of the Nginx-User to be immediately terminated.

Such deficiencies of the prior container network architecture can be remedied with explicit source verification of the present principles. For example, FIG. 10C depicts packet data related to an attempt of an attacker to inject RST packets into a container security system implementing source verification in accordance with an embodiment the present principles. Although the attacker attempts to inject RST packets as depicted in FIG. 10C, the RST packets are rejected (as depicted in FIG. 10D) by the implementation of source verification of the present principles and the RST packets are prevented from reaching the Nginx-User (R5).

The inventors constructed a Kubernetes environment with a Weave overlay network to evaluate how the implementation of a container security system of the present principles affected the Kubernetes environment. In the constructed Kubernetes environment, one system served as the Kubernetes master node, while two others acted as container-hosting nodes. Each system was configured with an Intel Xeon E5-2630v4 CPU, 64 GB of RAM, and an Intel 10 Gbps NIC. netperf and iperf were respectively used to measure round-trip latencies and TCP stream throughputs.

As previously recited, embodiments of a container security system of the present principles, such as the container security system 100 of FIG. 1, periodically retrieve container information from container platforms and query for new containers. When a new container is detected, the container security system establishes/deploys the network stack for each new container. To investigate a length of time for establishing/deploying a new network stack in accordance with the present principles, the inventors measured the deployment time for creating 100 containers. In the experiment, the inventors determined that it took 2.67 seconds on average to execute the compilation of the network stack for each container. The inventors determined that such a deployment time is negligible since it takes a couple of seconds for containers to initialize their own services (i.e., pulling container images from repositories, configuring container isolation, and starting services).

FIG. 11 depicts a graphical representation of inter-container throughput variations with an increasing number of security policies within a host for both an iptables-based access control network and a network controlled using a container security system of the present principles, such as the container security system (CSS) 100 of FIG. 1. For a fair comparison with an iptables case, the same number of policies to each container are defined when the overheads of the network controlled using a container security system of the present principles are determined. In the case of iptables, security policies for all containers are maintained collectively in the host kernel. Thus, when packets arrive from containers, iptables first looks up the policies for the corresponding containers and inspects them individually with the incoming packets. Also, iptables needs a large number of field matches (at least, source and destination IP addresses and ports for each policy) since iptables is designed for general access control. As a result, as shown in FIG. 11, the throughput degraded by 23.3% with 100 policies and by 64.0% with 500 policies. This trend points to a fundamental scaling challenge with the current policy enforcement approach for container networks.

In contrast and as depicted in FIG. 11, the throughput degradation caused by the container security system (CSS) of the present principles was barely noticeable as the number of policies increased (3.2% with 500 policies) (R2). Such performance gains stem from a matching process of the present principles that is optimized for container environments, which comprises of a hash-based policy lookup for specific destinations and single field matches (i.e., destination port matches). Note, there is no need to match source IP addresses and ports like in the prior art cases since the network stack of a container security system of the present principles only maintains security policies that are specific to a respective container.

Figure 12A:
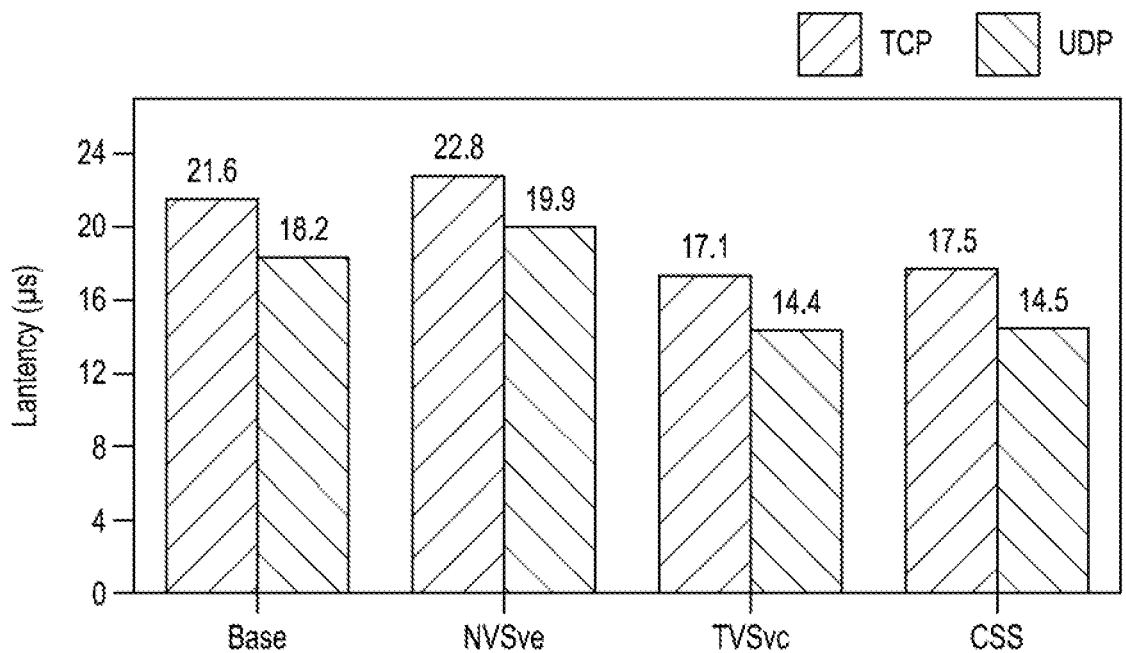
FIG. 12A depicts a graphical representation of inter-container latency measurements for different combinations of services within a host of a container network in accordance with an embodiment of the present principles.

FIG. 12A depicts a graphical representation of inter-container latency measurements for different combinations of services of a container security system of the present principles within a host. That is, FIG. 12A provides the round-trip latency comparison of four test cases within a single node. In FIG. 12A, the base case provides latency measurements for a default configuration of two containers that interacted with no security services, which were 21.6 μs and 18.2 μs for TCP and UDP packets respectively. When the network visibility service of a container security system of the present principles was applied, the latencies slightly increased by 5.7% and 9.3% due to the newly applied security functions requiring additional packet processing to derive the reachability check between containers. When the traffic visibility service of the container security system of the present principles was applied, the overall latencies were noticeably improved by 26.3% because the secure forwarding directly fed inter-container traffic into destination containers while bypassing the existing container networks. Finally, the overall performance improvement was observed with respect to the base case of 23.0% and 25.4% for TCP and UDP packets when all security functions of the container security system of the present principles were fully applied (R6). These latency improvements translated a cross-host throughput improvement of 12.9%.

Figure 12B:
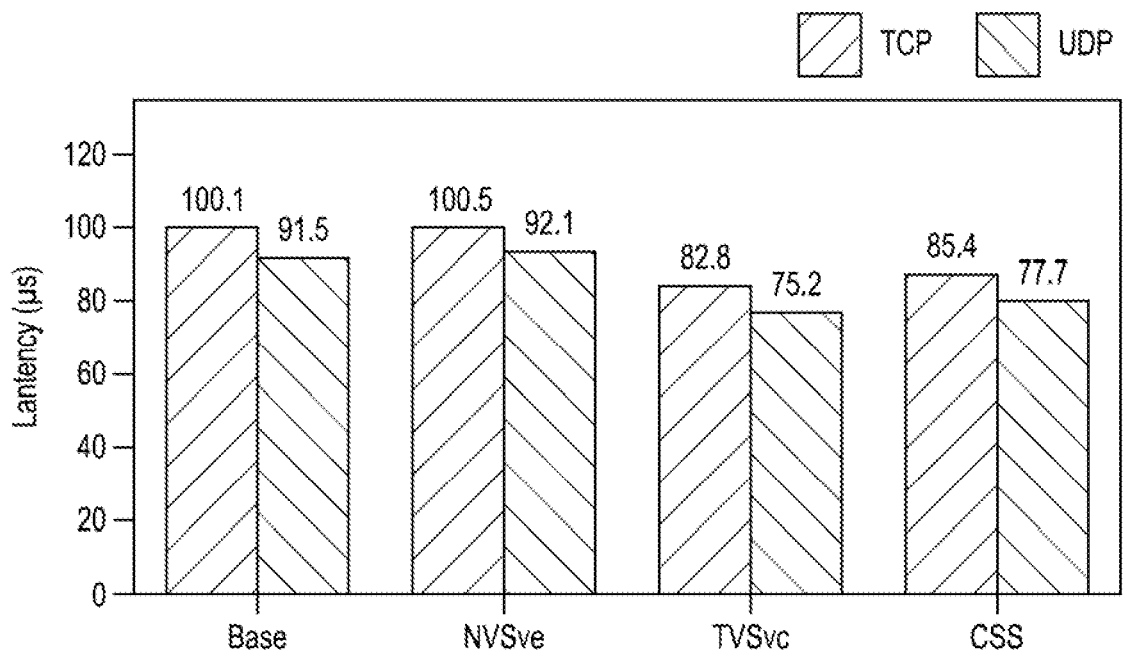
FIG. 12B depicts a graphical representation of inter-container latency measurements for different combinations of services of a container security system of the present principles across hosts in accordance with an embodiment of the present principles.

FIG. 12B depicts a graphical representation of inter-container latency measurements for different combinations of services of a container security system of the present principles across hosts. As depicted in FIG. 12B, compared to the intra-host measurements of FIG. 12A, the overall latencies significantly increased due to physical link traversal and tunneling overheads between hosts; thus, the latency of the base case became 100.1 μs and 91.5 μs for TCP and UDP packets respectively. Also, given the network impact, the overhead caused by the network-visibility service of the present principles receded (less than 1%). For the traffic-visibility service of the present principles, the latencies were reduced by 21.3% on average because the secure forwarding of the present principles directly passes network packets from the source container to the destination container via the external interfaces. Finally, when all security services of the present principles were applied, the latencies decreased by 17.7%, a significant improvement compared to the base case (R6). These latency improvements translated to a cross-host throughput improvement of 12.9%

Figure 13:
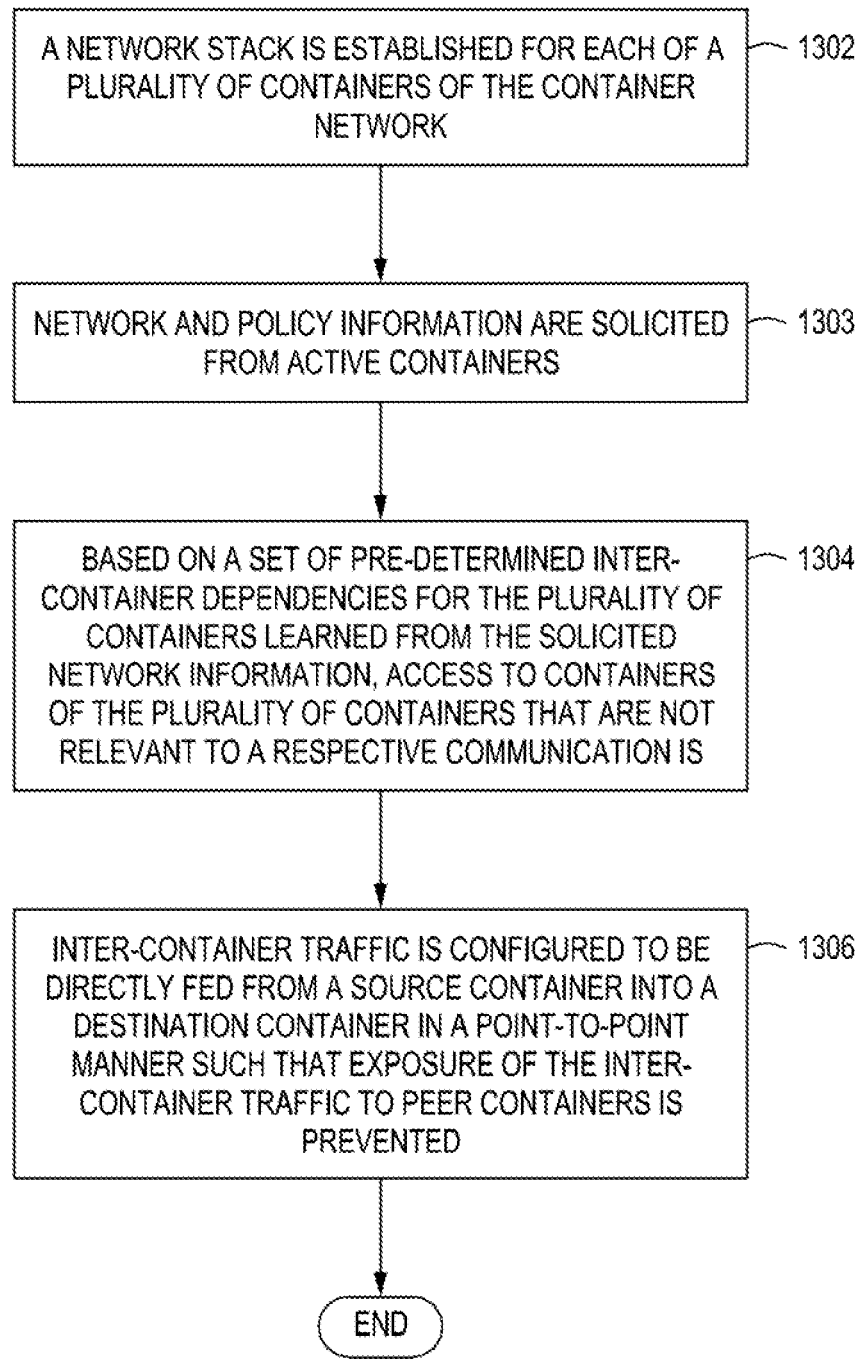
FIG. 13 depicts a flow diagram of a method for providing security for container networks in accordance with the present principles.

FIG. 13 depicts a flow diagram of a method 1300 for providing security for container networks in accordance with the present principles. The method 1300 begins at 1302 during which a network stack is established for each of a plurality of containers of the container network. The method 1300 can proceed to 1303.

At 1303, network and policy information are determined from active containers. The method 1300 can proceed to 1304.

At 1304, based on a set of pre-determined inter-container dependencies for the plurality of containers learned from the determined network information, access to containers of the plurality of containers that are not relevant to a respective communication is at least limited if not denied. The method 1300 can proceed to 1306.

At 1306, inter-container traffic is configured to be directly fed from a source container into a destination container in a point-to-point manner such that exposure of the inter-container traffic to peer containers is prevented. The method 1300 can be exited.

As depicted in FIG. 1, embodiments of a container security system of the present principles, such as the container security system 100 of FIG. 1, can be implemented in a computing device 1400 in accordance with the present principles. That is, in some embodiments, network packets, communications, data and the like can be communicated to and among containers and components of the container security system 100 using the computing device 1400 via, for example, any input/output means associated with the computing device 1400. Data associated with a container security system in accordance with the present principles can be presented to a user using an output device of the computing device 1400, such as a display, a printer or any other form of output device.

Figure 14:
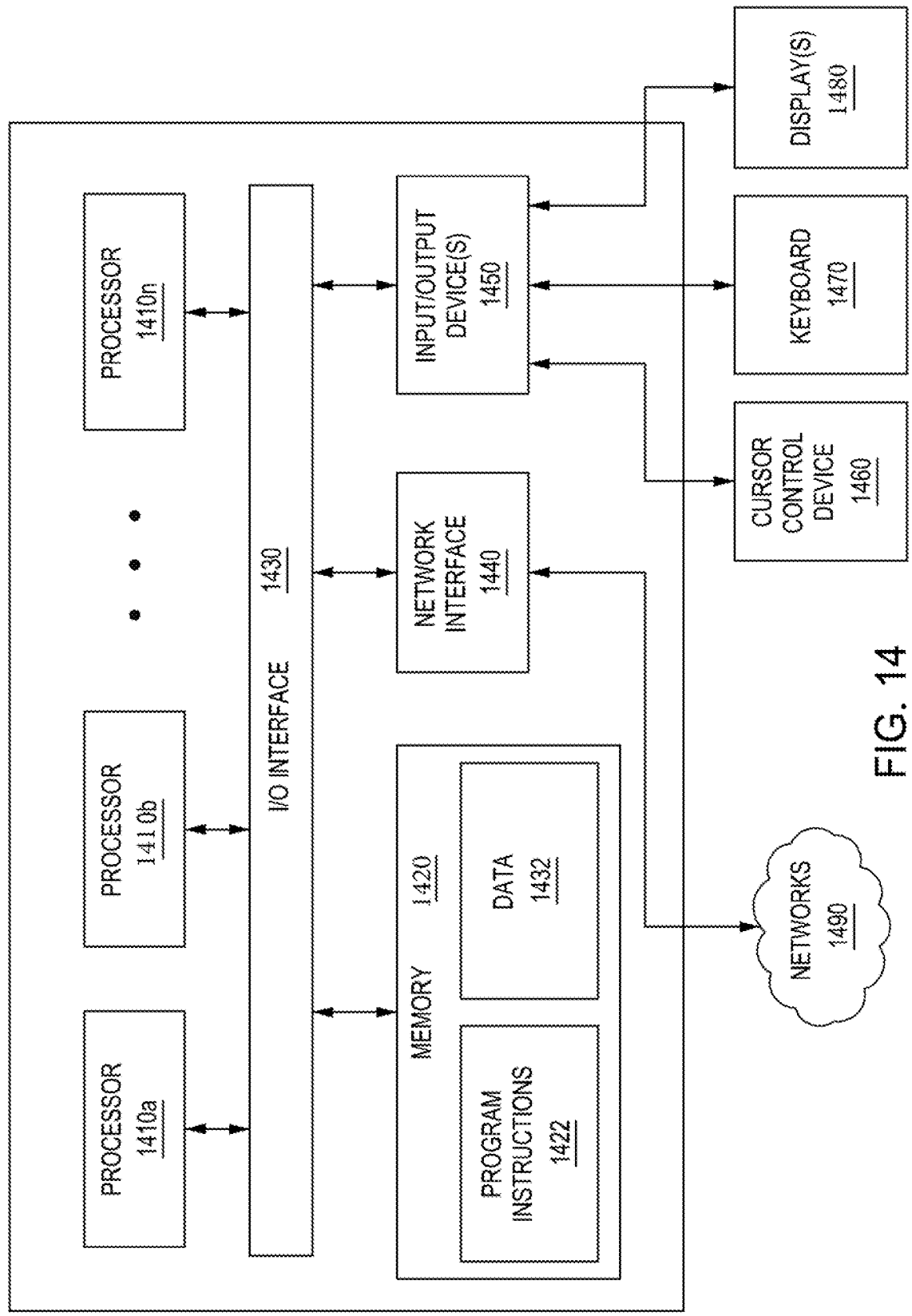
FIG. 14 depicts a high-level block diagram of a computing device suitable for use with embodiments of a container security system in accordance with the present principles.

For example, FIG. 14 depicts a high-level block diagram of a computing device 1400 suitable for use with embodiments of a container security system in accordance with the present principles such as the container security system 100 of FIG. 1. In some embodiments, the computing device 1400 can be configured to implement methods of the present principles as processor-executable executable program instructions 1422 (e.g., program instructions executable by processor(s) 910) in various embodiments.

In the embodiment of FIG. 14, the computing device 1400 includes one or more processors 1410a-1410n coupled to a system memory 1420 via an input/output (I/O) interface 1430. The computing device 1400 further includes a network interface 1440 coupled to I/O interface 1430, and one or more input/output devices 1450, such as cursor control device 1460, keyboard 1470, and display(s) 1480. In various embodiments, a user interface can be generated and displayed on display 1480. In some cases, it is contemplated that embodiments can be implemented using a single instance of computing device 1400, while in other embodiments multiple such systems, or multiple nodes making up the computing device 1400, can be configured to host different portions or instances of various embodiments. For example, in one embodiment some elements can be implemented via one or more nodes of the computing device 1400 that are distinct from those nodes implementing other elements. In another example, multiple nodes may implement the computing device 900 in a distributed manner.

In different embodiments, the computing device 1400 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 1400 can be a uniprocessor system including one processor 1410, or a multiprocessor system including several processors 1410 (e.g., two, four, eight, or another suitable number). Processors 1410 can be any suitable processor capable of executing instructions. For example, in various embodiments processors 1410 may be general-purpose or embedded processors implementing any of a variety of instruction set architectures (ISAs). In multiprocessor systems, each of processors 1410 may commonly, but not necessarily, implement the same ISA.

System memory 1420 can be configured to store program instructions 1422 and/or data 1432 accessible by processor 1410. In various embodiments, system memory 1420 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1420. In other embodiments, program instructions and/or data can be received, sent or stored upon different types of computer-accessible media or on similar media separate from system memory 1420 or computing device 1400.

In one embodiment, I/O interface 1430 can be configured to coordinate I/O traffic between processor 1410, system memory 1420, and any peripheral devices in the device, including network interface 1440 or other peripheral interfaces, such as input/output devices 1450. In some embodiments, I/O interface 1430 can perform any necessary protocol, timing or other data transformations to convert data signals from one component (e.g., system memory 1420) into a format suitable for use by another component (e.g., processor 1410). In some embodiments, I/O interface 1430 can include support for devices attached through various types of peripheral buses, such as a variant of the Peripheral Component Interconnect (PCI) bus standard or the Universal Serial Bus (USB) standard, for example. In some embodiments, the function of I/O interface 1430 can be split into two or more separate components, such as a north bridge and a south bridge, for example. Also, in some embodiments some or all of the functionality of I/O interface 1430, such as an interface to system memory 1420, can be incorporated directly into processor 1410.

Network interface 1440 can be configured to allow data to be exchanged between the computing device 1400 and other devices attached to a network (e.g., network 1490), such as one or more external systems or between nodes of the computing device 1400. In various embodiments, network 1490 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1440 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1450 can, in some embodiments, include one or more display terminals, keyboards, keypads, touchpads, scanning devices, voice or optical recognition devices, or any other devices suitable for entering or accessing data by one or more computer systems. Multiple input/output devices 1450 can be present in computer system or can be distributed on various nodes of the computing device 1400. In some embodiments, similar input/output devices can be separate from the computing device 1400 and can interact with one or more nodes of the computing device 1400 through a wired or wireless connection, such as over network interface 1440.

Those skilled in the art will appreciate that the computing device 1400 is merely illustrative and is not intended to limit the scope of embodiments. In particular, the computer system and devices can include any combination of hardware or software that can perform the indicated functions of various embodiments, including computers, network devices, Internet appliances, PDAs, wireless phones, pagers, and the like. The computing device 1400 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 1400 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 1400 can further include a web browser.

Although the computing device 1400 is depicted as a general purpose computer, the computing device 1400 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 15:
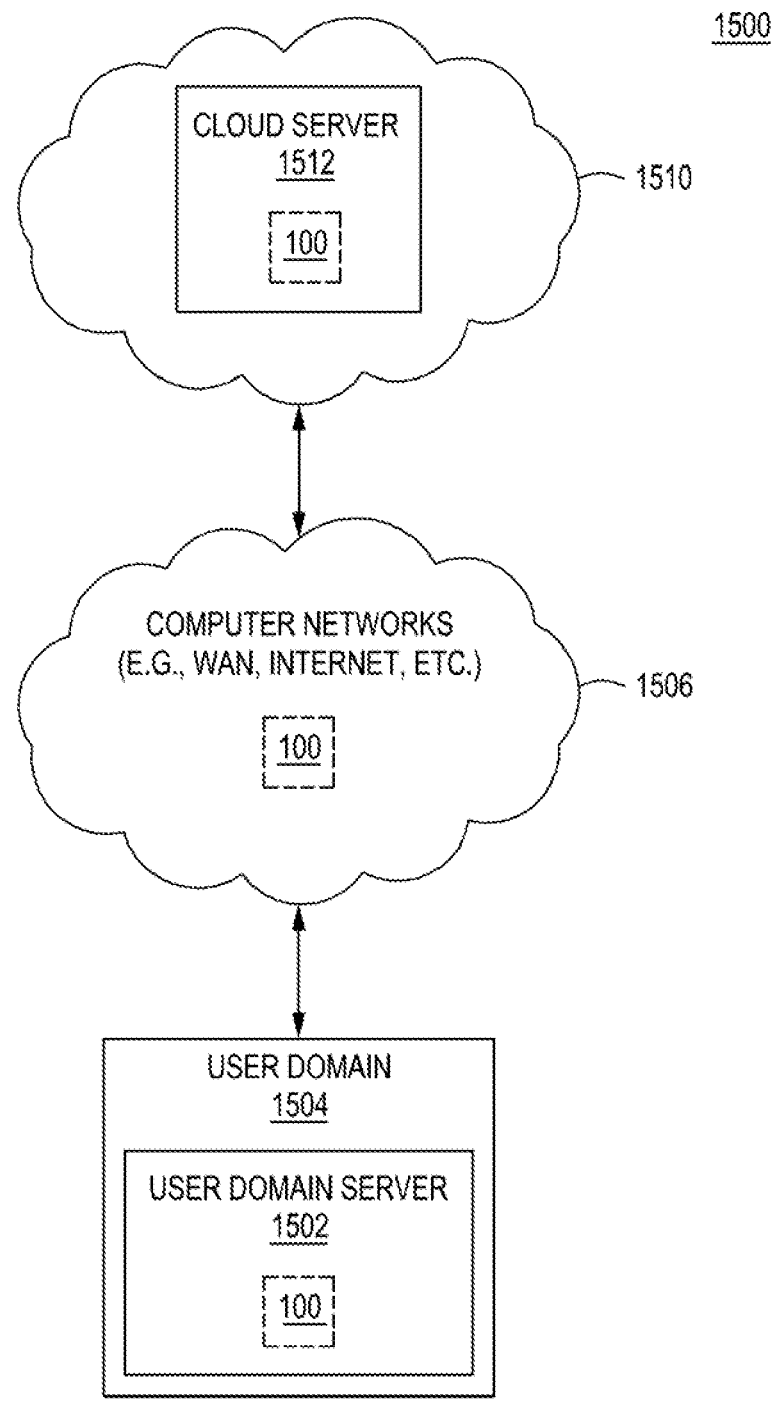
FIG. 15 depicts a high-level block diagram of a network in which embodiments of a container security system in accordance with the present principles, such as the container security system of FIG. 1, can be applied.

FIG. 15 depicts a high-level block diagram of a network in which embodiments of a container security system in accordance with the present principles, such as the container security system 100 of FIG. 1, can be applied. The network environment 1500 of FIG. 15 illustratively comprises a user domain 1502 including a user domain server/computing device 1504. The network environment 1500 of FIG. 15 further comprises computer networks 1506, and a cloud environment 1510 including a cloud server/computing device 1512.

In the network environment 1500 of FIG. 15, a system for container security in accordance with the present principles, such as the system 100 of FIG. 1, can be included in at least one of the user domain server/computing device 1504, the computer networks 1506, and the cloud server/computing device 1512. That is, in some embodiments, a user can use a local server/computing device (e.g., the user domain server/computing device 1504) to provide container security in accordance with the present principles.

In some embodiments, a user can implement a system for container security in the computer networks 1506 to provide container security in accordance with the present principles. Alternatively or in addition, in some embodiments, a user can implement a system for container security in the cloud server/computing device 1512 of the cloud environment 1510 to provide container security in accordance with the present principles. For example, in some embodiments it can be advantageous to perform processing functions of the present principles in the cloud environment 1510 to take advantage of the processing capabilities and storage capabilities of the cloud environment 1510.

In some embodiments in accordance with the present principles, a system for providing container security in a container network can be located in a single and/or multiple locations/servers/computers to perform all or portions of the herein described functionalities of a system in accordance with the present principles. For example, in some embodiments containers 110 of a container network can be located in one or more than one of the a user domain 1502, the computer network environment 1506, and the cloud environment 1510 and at least one global manager of the present principles, such as the global manager 120, can be located in at least one of the user domain 1502, the computer network environment 1506, and the cloud environment 1510 for providing the functions described above either locally or remotely.

In some embodiments, container security of the present principles can be provided as a service, for example via software. In such embodiments, the software of the present principles can reside in at least one of the user domain server/computing device 1504, the computer networks 1506, and the cloud server/computing device 1512. Even further, in some embodiments software for providing the embodiments of the present principles can be provided via a non-transitory computer readable medium that can be executed by a computing device at any of the computing devices at the user domain server/computing device 1504, the computer networks 1506, and the cloud server/computing device 1512.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from the computing device 1400 can be transmitted to the computing device 1400 via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. When provided as software, embodiments of the present principles can reside in at least one of a computing device, such as in a local user environment, a computing device in an Internet environment and a computing device in a cloud environment. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description.

However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for providing security for a container network having a plurality of containers, comprising:
    establishing a network stack for each of the plurality of containers of the container network;
    determining network and policy information from active containers;
    determining inter-container dependencies for the plurality of containers by intersecting an ingress and egress policy of each of the containers of the plurality of containers in the container network;
    based on the set of determined inter-container dependencies for the plurality of containers, configuring container access in the container network to be limited to only containers of the plurality of containers that are relevant to a respective communication; and
    configuring inter-container traffic in the container network to be directed only from a source container into a destination container in a point-to-point manner such that exposure of the inter-container traffic to peer containers is prevented.

2. The method of claim 1, comprising determining the inter-container dependencies for each of the plurality of containers.

3. The method of claim 2, wherein the inter-container dependencies are determined using at least one of Address Resolution Protocol (ARP) requests and IP packets that identify network information associated with each respective container.

4. The method of claim 3, comprising verifying that a source container has a dependency on a destination container in the container network before fulfilling a respective ARP request.

5. The method of claim 1, comprising determining the inter-container dependencies for each of the plurality of containers using a method, comprising:
    using operator-specified policies to build an initial inter-container dependency map;
    for containers of the plurality of containers belonging to a same container set, adding the containers of the same container set into the inter-container dependency map as explicitly dependent containers;
    for containers of the plurality of containers belonging to different container sets in a same microservice group, adding the containers into the inter-container dependency map by intersecting egress policies of each container in a set with internal service ports of containers in other container sets in the same microservice group; and
    for cross microservice-group communications, adding a representative IP addresses for each of other microservices groups into the inter-container dependency map of containers of a subject microservice group by intersecting egress policies of each container of the subject microservice group with respective global service ports.

6. The method of claim 1, comprising dividing the plurality of containers into container sets wherein containers within a same container set are granted interconnectivity.

7. The method of claim 1, further comprising:
    comparing an IP address and a MAC address of incoming packets to a container against all gateway information associated with the container to prevent unauthorized host accesses to the container.

8. An apparatus for providing security for a container network having a plurality of containers, comprising:
    a processor; and
    a memory coupled to the processor, the memory having stored therein at least one of programs or instructions executable by the processor to configure the apparatus to:
    establish a network stack for each of the plurality of containers of the container network;
    determine network and policy information from active containers;
    determine inter-container dependencies for the plurality of containers by intersecting an ingress and egress policy of each of the containers of the plurality of containers in the container network;
    based on the set of determined inter-container dependencies for the plurality of containers, limit container access in the container network to only containers of the plurality of containers that are relevant to a respective communication; and
    direct inter-container traffic in the container network from a source container into a destination container in a point-to-point manner such that exposure of the inter-container traffic to peer containers is prevented.

9. The apparatus of claim 8, wherein the network stack maintains a respective container network map for each container of the plurality of containers.

10. The apparatus of claim 8, wherein the determined network and policy information comprises at least a respective container network map and a respective inter-container dependency map for each of the plurality of containers.

11. The apparatus of claim 8, wherein the global manager determines the inter-container dependencies for each of the plurality of containers.

12. The apparatus of claim 8, wherein the global manager determines the inter-container dependencies using at least one of Address Resolution Protocol (ARP) requests and IP packets that identify network information associated with each respective container.

13. The apparatus of claim 12, further comprising a direct ARP handler configured to verify that a source container has a dependency on a destination container in the container network before a respective ARP request can be fulfilled.

14. The apparatus of claim 8, wherein the global manager determines the inter-container dependencies for each of the plurality of containers using a method, comprising:
    using operator-specified policies to build an initial inter-container dependency map by intersecting the ingress and egress policy of each of the containers of the plurality of containers in the container network;

for containers of the plurality of containers belonging to a same container set, adding the containers of the same container set into the inter-container dependency map as explicitly dependent containers;

for containers of the plurality of containers belonging to different container sets in a same microservice group, adding the containers into the inter-container dependency map by intersecting egress policies of each container in a set with internal service ports of containers in other container sets in the same microservice group; and for cross microservice-group communications, adding a representative IP addresses for each of other microservices groups into the inter-container dependency map of containers of a subject microservice group by intersecting egress policies of each container of the subject microservice group with respective global service ports.

15. The apparatus of claim 8, wherein the global manager updates a map of inter-container dependencies for only containers of the plurality of containers that are affected by a change in a topology of the container network.

16. The apparatus of claim 8, wherein the plurality of containers are divided into container sets and wherein containers within a same container set are granted interconnectivity.

17. The apparatus of claim 8, further comprising an IP handler configured to compare an IP address and a MAC address of incoming packets to a container against all gateway information associated with the container to prevent unauthorized host accesses to the container.

18. A method for providing security for container networks having a plurality of containers, comprising:

monitoring traffic in the container networks and generating network logs of the container traffic;

determining network and policy information of the container networks from the network logs;

determining inter-container dependencies for the plurality of containers by intersecting an ingress and egress policy of each of the containers of the plurality of containers in the container networks;

determining a least privileged communication policy for the plurality of containers from the determined network and policy information and the determined inter-container dependencies;

configuring container access in the container networks to be limited to only containers of the plurality of containers that are relevant to a respective communication based on the determined least privileged communication policy; and configuring inter-container traffic in the container networks to be directed only from a source container into at least one destination container in a point-to-point manner such that exposure of the inter-container traffic to peer containers is prevented.

19. The method of claim 18 comprising comparing the determined network and policy information to respective inter-container dependency maps of the plurality of containers to determine at least one of an out-of-policy access attempt and an unused policy.

20. The method of claim 19, comprising causing at least one of an addition of a respective communication policy to accommodate the out-of-policy access attempt and the removal of the at least one unused policy.

* * * * *